United States Patent
Aizawa

(10) Patent No.: US 7,698,594 B2
(45) Date of Patent: Apr. 13, 2010

(54) RECONFIGURABLE PROCESSOR AND RECONFIGURATION METHOD EXECUTED BY THE RECONFIGURABLE PROCESSOR

(75) Inventor: Eiji Aizawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 253 days.

(21) Appl. No.: 11/622,738

(22) Filed: Jan. 12, 2007

(65) Prior Publication Data
US 2007/0180315 A1 Aug. 2, 2007

(30) Foreign Application Priority Data
Jan. 13, 2006 (JP) .............................. 2006-006295

(51) Int. Cl.
*G06F 11/16* (2006.01)
(52) U.S. Cl. .......................................... 714/10; 716/16
(58) Field of Classification Search ...................... 716/3, 716/10, 13, 16, 17; 712/10–22; 714/3, 10, 714/13
See application file for complete search history.

(56) References Cited

U.S. PATENT DOCUMENTS

| 5,485,604 | A  | * | 1/1996 | Miyoshi et al. ................ 714/10 |
| 6,826,674 | B1 |   | 11/2004 | Sato |
| 6,904,514 | B1 |   | 6/2005 | Sato |
| 2005/0038550 | A1 | | 2/2005 | Sato |
| 2005/0240757 | A1 | | 10/2005 | Sato |
| 2006/0195684 | A1 | | 8/2006 | Fukatsu |

* cited by examiner

*Primary Examiner*—William M Treat
(74) *Attorney, Agent, or Firm*—Rossi, Kimms & McDowell LLP

(57) ABSTRACT

A reconfigurable processor which is capable of carrying out or continuing processing even after occurrence of an error in a data processing unit within the reconfigurable processor. The reconfigurable processor has a processing element matrix comprised of a plurality of processing elements. The reconfigurable processor reconfigures the processing element matrix according to an error of the processing element matrix.

13 Claims, 10 Drawing Sheets

RECONFIGURABLE PROCESSOR AND RECONFIGURATION METHOD EXECUTED BY THE RECONFIGURABLE PROCESSOR

BACKGROUND OF THE INVENTION

1. Field of the Invention

The present invention relates to a reconfigurable processor and a reconfiguration method executed by the reconfigurable processor.

2. Description of the Related Art

In recent years, there has been an increasing demand for a technique for shortening an LSI design period, i.e. time taken to complete the design of an LSI. With an increase in the demand, attention is being given to the use of a dynamically reconfigurable device as one solution to the demand for shortening the LSI design period. The dynamically reconfigurable device is an LSI that incorporates a plurality of processing units (processing elements) each having an arithmetic logic unit (ALU), such that ALU control in each processing unit and connections between the processing units can be dynamically switched to different ones (during the operation of the LSI).

The dynamically reconfigurable device dynamically switches between circuits during execution of an application, thereby making the same LSI thereof compatible with a plurality of applications. The dynamically reconfigurable devices is typified by a DAPDNA and a DRP. Both the DAPDNA and the DRP incorporate hundreds of processing elements to thereby maintain high processing performance.

There have been proposed various techniques related to the dynamically reconfigurable device (see U.S. Patent Publication No. 2005/0038550).

In general, an LSI incorporates an error detector circuit for identifying the cause of an error, so as to cope with occurrence of a fault (error) during execution of an application by the LSI manufactured. This enables, even if an error occurs during execution of the application, the LSI to detect the error immediately, and perform maintenance suitable for the identified cause of the error. If the error having occurred is fatal, the LSI is replaced by a new one, whereas if the error is not fatal, a countermeasure is taken e.g. for continuing processing with reduced performance.

However, the conventional dynamically reconfigurable device is not provided with an error detecting means. For this reason, when an error occurs in the dynamically reconfigurable device during execution of an application by the LSI, it is impossible to detect the error immediately. This is fatal when the dynamically reconfigurable device is used for a mission critical system (i.e. a backbone system requiring high reliability and fault tolerance). Further, since the dynamically reconfigurable device is not provided with an error detecting means, even when an error that is not fatal occurs, it is required to replace the LSI with a new one, which causes an increase in cost.

SUMMARY OF THE INVENTION

It is an object of the present invention to provide a reconfigurable processor which is capable of carrying out or continuing processing even after occurrence of an error in a data processing unit within the reconfigurable processor, and a reconfiguration method executed by the reconfigurable processor.

To attain the above object, in a first aspect of the present invention, there is provided a reconfigurable processor comprising a processing unit having a plurality of data processing units, and a reconfiguration unit that reconfigures the processing unit according to an error of the processing unit.

Preferably, the reconfiguration unit reconfigures the processing unit such that a data processing unit where an error has occurred does not have any effects on output from the processing unit.

Preferably, each of the data processing units has a detection unit that detects an error thereof.

Preferably, the processing unit restarts processing after being reconfigured.

Preferably, the processing unit processes data read out from a storage device, and the reconfiguration unit determines a storage location of data to be processed by the processing unit after reconfiguration, in the storage device, according to progress of processing by the processing unit.

To attain the above object, in a second aspect of the present invention, there is provided a method of reconfiguring a reconfigurable processor having a plurality of data processing units, comprising a detection step of detecting an error in each of the data processing units, and a reconfiguration step of reconfiguring the reconfigurable processor in response to detection of an error.

Preferably, the reconfiguration step reconfigures the reconfigurable processor such that a data processing unit where an error has occurred does not have any effects on output of the reconfigurable processor.

Preferably, the method comprises a step of causing the reconfigurable processor to restart processing after being reconfigured.

Preferably, the method comprises a step of determining a storage location of data to be processed by the reconfigurable processor after reconfiguration, according to progress of processing by the reconfigurable processor.

To attain the above object, in a third aspect of the present invention, there is provided a computer program for reconfiguring a reconfigurable processor including a plurality of data processing units, comprising a detection module for detecting an error in each of the processing devices, and a reconfiguration module for reconfiguring the reconfigurable processor in response to detection of an error.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The present invention will now be described in detail with reference to the drawings showing a preferred embodiment thereof.

Figure 1:
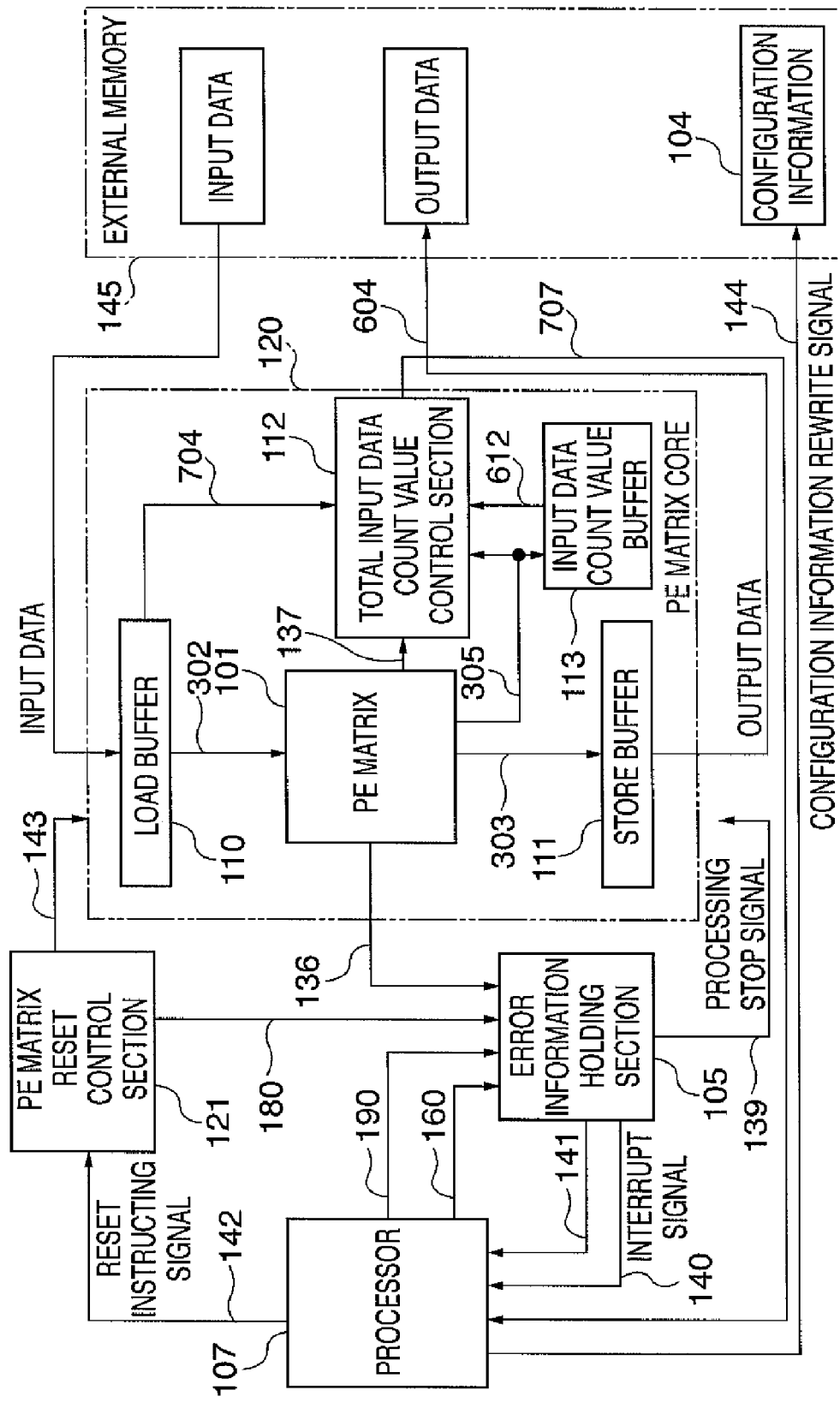
FIG. 1 is a block diagram of a dynamically reconfigurable device fault-detectable processing unit according to an embodiment of the present invention.

FIG. 1 is a block diagram of a dynamically reconfigurable device fault-detectable processing unit implementing a reconfigurable processor according to the embodiment of the present invention.

As shown in FIG. 1, this dynamically reconfigurable device fault-detectable processing unit is comprised of an error information holding section 105, a processor 107, a processing element matrix core 120, a processing element matrix reset control section 121, and an external memory 145. Further, the processing element matrix core 120 is comprised of a processing element matrix 101, a load buffer 110, a store buffer 111, a total input data count value control section 112, and an input data count value buffer 113. In the following description, a term "processing element" is denoted as "PE", as deemed appropriate.

The dynamically reconfigurable device fault-detectable processing unit modifies configuration information thereof when a dynamically reconfigurable device thereof becomes faulty during execution of an application, and re-executes processing during execution of which an error occurred, to thereby continue the processing even after occurrence of a faulty operation of the dynamically reconfigurable device.

The PE matrix 101 is a dynamically reconfigurable device comprised of a plurality of processing units (processing elements) each having one or more computing elements provided therein. The PE matrix 101 is capable of dynamically changing the configuration of these computing elements and connections between the processing units by modifying configuration information, described in detail hereinafter. The PE matrix 101 is internally provided with a two-dimensional array structure of the processing elements each functioning as a minimum processing unit. The load buffer 110 temporarily stores input data to be input to the processing elements from the external memory 145.

The store buffer 111 temporarily stores output data 303, referred to hereinafter, delivered from the PE matrix 101, and delivers output data 604, referred to hereinafter, to the external memory 145. The total input data count value control section 112 performs control for calculating the total value of counts of input data items currently being used by the PE matrix 101. The input data count value buffer 113 stores the number of input data items used for obtaining output data stored in the store buffer 111.

The error information holding section 105 holds error information indicative of an error having occurred in the PE matrix 101. The processor 107 rewrites configuration information stored in the external memory 145 by delivering a configuration information rewrite signal 144 to the external memory 145. Further, the processor 107 gives a reset instruction to the PE matrix reset control section 121 by delivering a reset instructing signal 142 thereto. The PE matrix reset control section 121 performs control for resetting the PE matrix core 120. The external memory 145 stores input data, output data, and the configuration information 104 associated with the processing elements.

The error information holding section 105 delivers an interrupt signal 140 to the processor 107 to notify the same that error information has been set in the error information holding section 105. Further, the error information holding section 105 delivers a processing stop signal 139 to the PE matrix core 120 so as to stop the operation of the PE matrix core 120 when error information is set in the error information holding section 105. The PE matrix reset control section 121 delivers a reset signal 143 to the PE matrix core 120 so as to reset the PE matrix core 120. Other signals than the above-mentioned ones will be referred to hereinafter.

Figure 8:
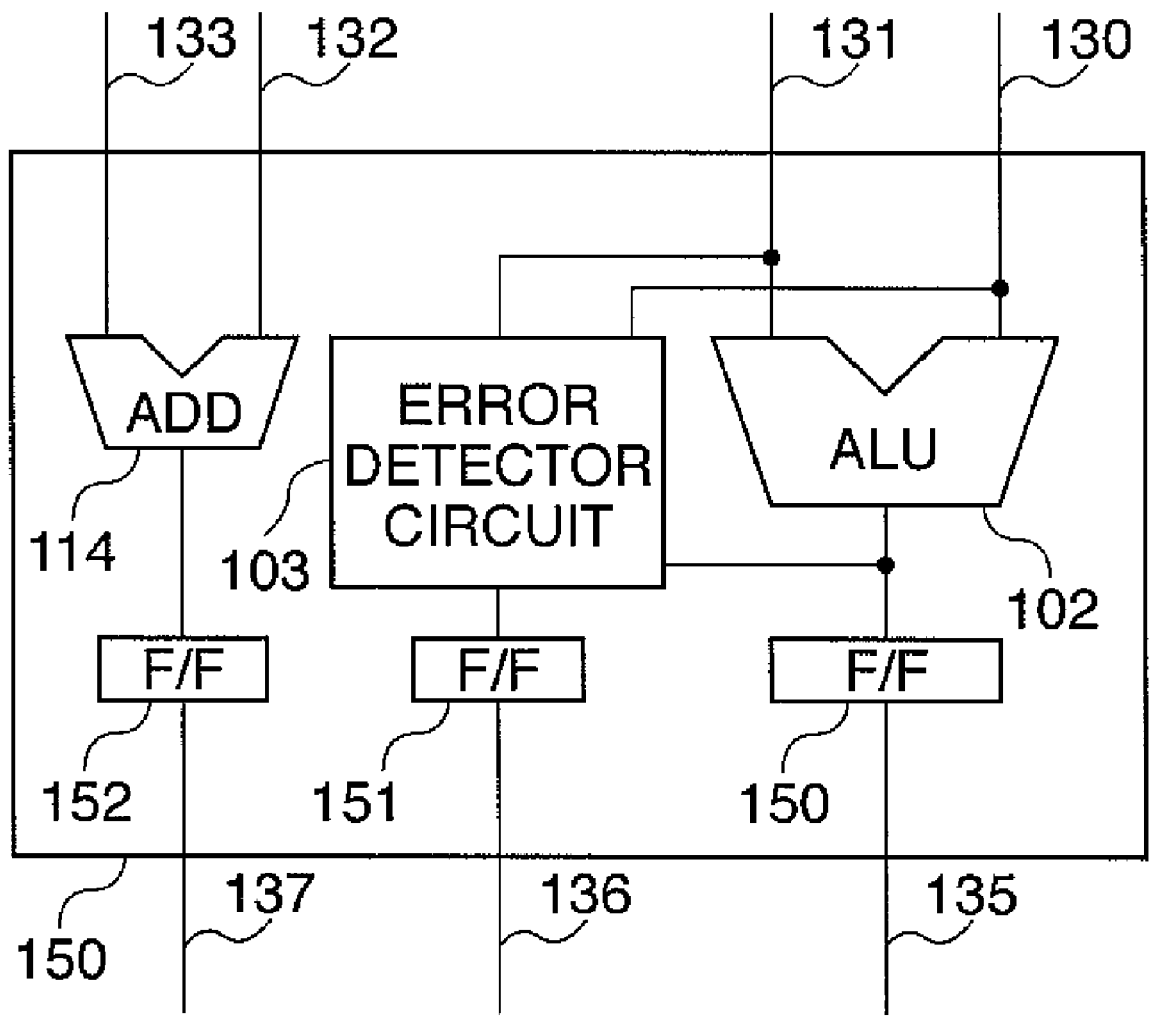
FIG. 8 is a block diagram of a processing element as a minimum component element in the PE matrix.

FIG. 8 is a block diagram of a processing element as the minimum component element in the PE matrix 101.

Referring to FIG. 8, an ALU 102 is a computing element provided in the processing element 301. An error detector circuit 103 is also provided in the processing element 301, and incorporates an ALU. The error detector circuit 103 performs comparison between a value obtained by an operation of the ALU thereof and a value obtained by an operation of the ALU 102 (dual-redundant ALU operation), to thereby detect an error of the processing element. An adder 114 performs an add operation to obtain the number of input data items being processed by the processing element 301. Reference numerals 150, 151, and 152 indicate flip-flops connected to the ALU 102, the error detector circuit 103, and the adder 114, respectively. Input data items 130 and 131 are input to the ALU 102 from other processing elements or the load buffer 110.

Signals 132 and 133 are indicative of input data counts associated with the respective input data items 130 and 131. More specifically, the signals 132 and 133 indicate how many original data items have been used to obtain the respective input data items 130 and 131, respectively. A signal 135 is indicative of a value obtained by the ALU 102. A signal 136 is indicative of a result of error detection by the error detector circuit 103. A signal 137 is indicative of an input data count obtained by the add operation by the adder 114.

Next, an error detecting process and an error control method executed by the dynamically reconfigurable device fault-detectable processing unit according to the present embodiment will be described with reference to FIGS. 1 and 8.

For example, the fact that the ALU 102 in the processing element 301 has failed is detected as follows: The error detector circuit 103 of the processing element 301 performs comparison between a value output from the ALU 102 and a value output from the ALU of its own. If these values are different, the error detector circuit 103 detects as an error. The error information detected by the error detector circuit 103 is output via the flip-flop 151 as the error signal 136. The error information output as the error signal 136 is set and held in the error information holding section 105. It should be noted that the error information is output on a processing element-by-processing element basis.

When a new value of error information is set anew in the error information holding section 105, the error information holding section 105 asserts the interrupt signal 140 to notify the processor 107 of an interrupt. At the same time, the error information holding section 105 asserts the processing stop signal 139 to stop processing by the PE matrix core 120.

A signal 141 is output as the error information from the error information holding section 105. The processor 107 reads the signal 141 (error information) upon receipt of the interrupt signal 140 to thereby acquire information on the faulty processing element. An interrupt mask signal 160 masks the interrupt signal 140. The processor 107 asserts the interrupt mask signal 160 to thereby mask the interrupt signal 140.

After having acquired the information on the faulty processing element, the processor 107 rewrites the configuration information 104 so as to inhibit the use of the faulty processing element. Further, the processor 107 acquires the number of input data items currently being use by the PE matrix core 120 from a signal 707 delivered from the total input data count value control section 112, and calculates a reload address using an external memory address calculation logic, described hereinafter, for reloading input data. Thereafter, the processor 107 asserts the reset instructing signal 142.

In response to this, the PE matrix reset control section 121 asserts the reset signal 143 to thereby reset the PE matrix core 120. After resetting the PE matrix core 120 via the PE matrix reset control section 121, the processor 107 asserts a signal 190 to thereby deassert the processing stop signal 139. The deassertion of the processing stop signal 139 enables the PE matrix core 120 to perform processing. Further, the processor 107 reloads input data in the PE matrix core 120, starting from the calculated reload address. This causes the PE matrix core 120 to restart normal processing.

Figure 2:
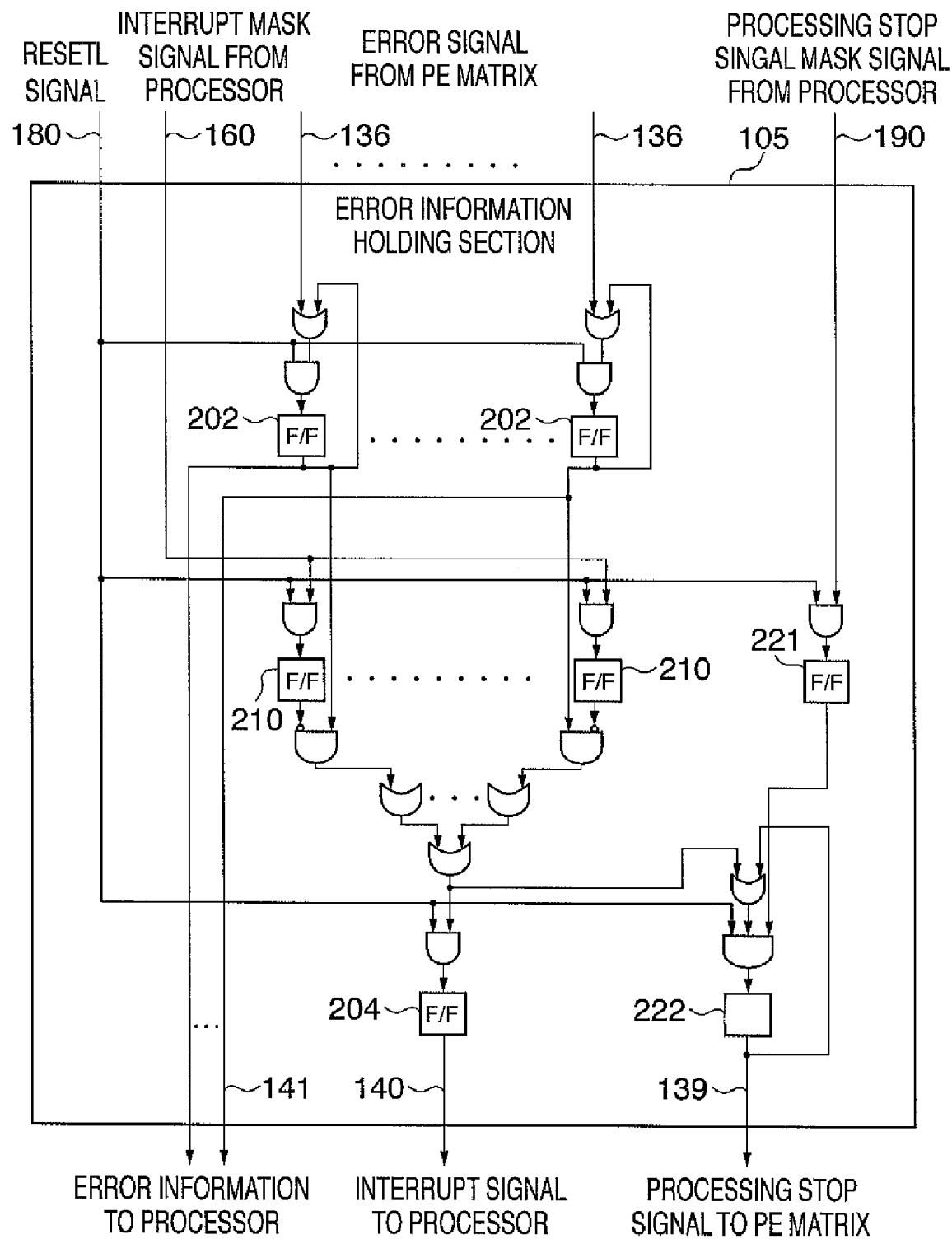
FIG. 2 is a block diagram of an error information holding section of the dynamically reconfigurable device fault-detectable processing unit.

FIG. 2 is a block diagram of the error information holding section 105 of the dynamically reconfigurable device fault-detectable processing unit.

As shown in FIG. 2, the error information holding section 105 is comprised of a plurality of flip-flops 202, a single flip-flop 204, a plurality of flip-flops 210, a single flip-flop 221, a single register 222, a plurality of AND gates, and a plurality of OR gates.

The error information holding section 105 receives the error signal 136 from each processing element 150 of the PE matrix 101 as error information. Each flip-flop 202 sets a value of the received error signal 136 (error information) therein. When the value set in the flip-flops 202 is indicative of an error, the flip-flop 202 hold the value therein. When the value set in the same is not indicative of an error, the flip-flop 202 awaits reception of a next value of the error signal 136 (error information) from the associated processing element 150 of the PE matrix 101.

The error information holding section 105 receives a reset signal 180 output from the PE matrix reset control section 121. The reset signal 180 is asserted when the power of the dynamically reconfigurable device fault-detectable processing unit is turned on, and used for resetting all the flip-flops 202 in the error information holding section 105.

The error information holding section 105 receives the interrupt mask signal 160 output from the processor 107. Each flip-flop 210 sets the value of the interrupt mask signal 160. The flip-flops 210 mask error information. A logical AND (logical product) of the error information output from the flip-flop 202 and the mask information set in the flip-flop 210 is determined, whereby the error information is masked.

The interrupt signal 140 is generated by obtaining an OR (logical sum) of all the values of the error information masked by the flip-flops 210, and is delivered to the processor 107 from the error information holding section 105.

The error information holding section 105 receives the signal 190 output from the processor 107 so as to mask the processing stop signal 139 that inhibits the PE matrix core 120 from processing. The flip-flop 221 masks the processing stop signal 139. The flip-flop 221 sets the value of the signal 190.

The register 222 outputs the processing stop signal 139. The register 222 sets a value (signal) obtained by calculating the AND (logical product) of a value (signal) obtained by calculating the OR (logical sum) of all the error information values in the error information holding section 105, the reset signal 180, and the value set in the flip-flop 221. Once error information has been set in the register 222, the register 222 continuously asserts the processing stop signal 139 until the error information is cleared by the value of the flip-flop 221.

The processing stop signal 139 stops processing by the PE matrix core 120. The signal 141 is output as error information from one of the flip-flops 202. The processor 107 determines a faulty processing element (PE) based on the signal 141 (error information).

Next, a description will be given of a method of address calculation which is executed when input data is to be reloaded, according to the present embodiment.

In the present embodiment, when an error occurs in a processing element, processing by the PE matrix core 120 is temporality stopped in response to the processing stop signal 139 from the error information holding section 105. Further, all data items in the PE matrix core 120 are invalidated in response to the reset signal 143 from the PE matrix reset control section 121. Then, the processor 107 modifies the configuration information 104 so as to inhibit the use of the faulty processing element. Thereafter, input data corresponding to the invalidated data is reloaded into the PE matrix core 120 from the external memory 145, and the processing by the PE matrix core 120 is carried out again. Thus, the processing by the PE matrix core 120 is continuously carried out.

In order to continue processing as described above, it is necessary to calculate a reload address of input data to be reloaded into the PE matrix core 120 from the external memory 145. The reload address from which data should start to be reloaded is determined by subtracting the number of input data items currently in use by the PE matrix 101 from an address from which data is to be read next if processing is normally continued. The reload address from which data should start to be reloaded can be calculated by following equation:

(reload address from which data should start to be reloaded)=(address from which data is to be read next)−(the number of input data items currently being processed by the PE matrix core).

In the equation, the number of input data items currently being processed by the PE matrix core 120 is equal to the sum of the number of input data items currently being processed by the PE matrix 101, the number of input data items currently stored in the load buffer 110, and the number of input data items used for obtaining output data currently stored in the store buffer 111. In the present embodiment, the store buffer 111 has a sufficiently large capacity for holding all output data from the PE matrix 101 at least during a time period from occurrence of an error in the PE matrix 101 to stoppage of operation of the PE matrix core 120.

Next, a method of calculating the number of input data items currently being processed by all the processing elements of the PE matrix 101 will be described with reference to FIGS. 3 to 5.

Figure 3:
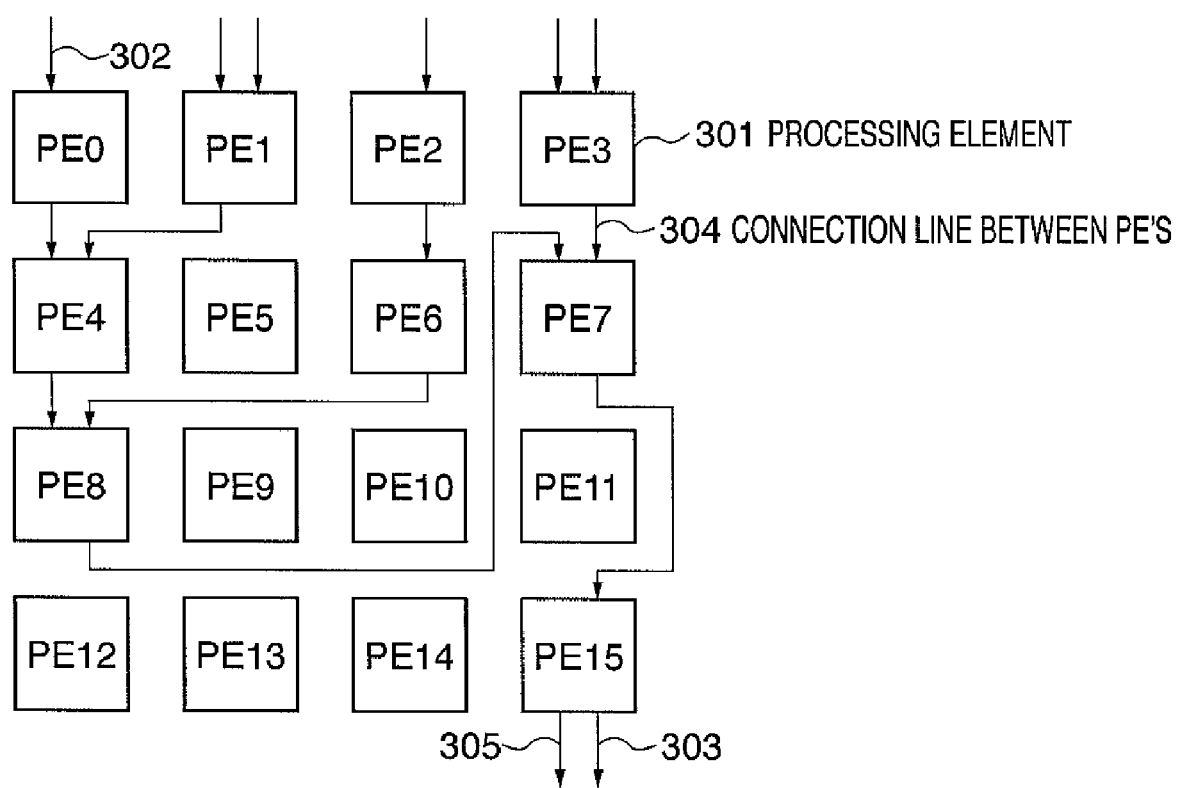
FIG. 3 is a diagram showing a state of connections used in an example of data count calculation in a PE matrix.

FIG. 3 is a diagram showing a state of connections within the PE matrix 101. FIG. 4 is a diagram showing counts of input data items in the respective processing elements in an initial input state. FIG. 5 is a diagram showing counts of input data items in the respective processing elements four clock cycles after the state shown in FIG. 4.

FIG. 3 shows an example of the connection relationship between 4×4 processing elements. Reference numeral 301 designates each processing element. Reference numeral 304 designates a connection line between two connected processing elements 301. No connection line is shown between processing elements 301 not connected to each other. Input data 302 is input to the PE matrix 101 from the load buffer 110, and the output data 303 is output from the PE matrix 101 to the store buffer 111. Further, an input data count 305 is output to the input data count value buffer 113.

Figure 4:
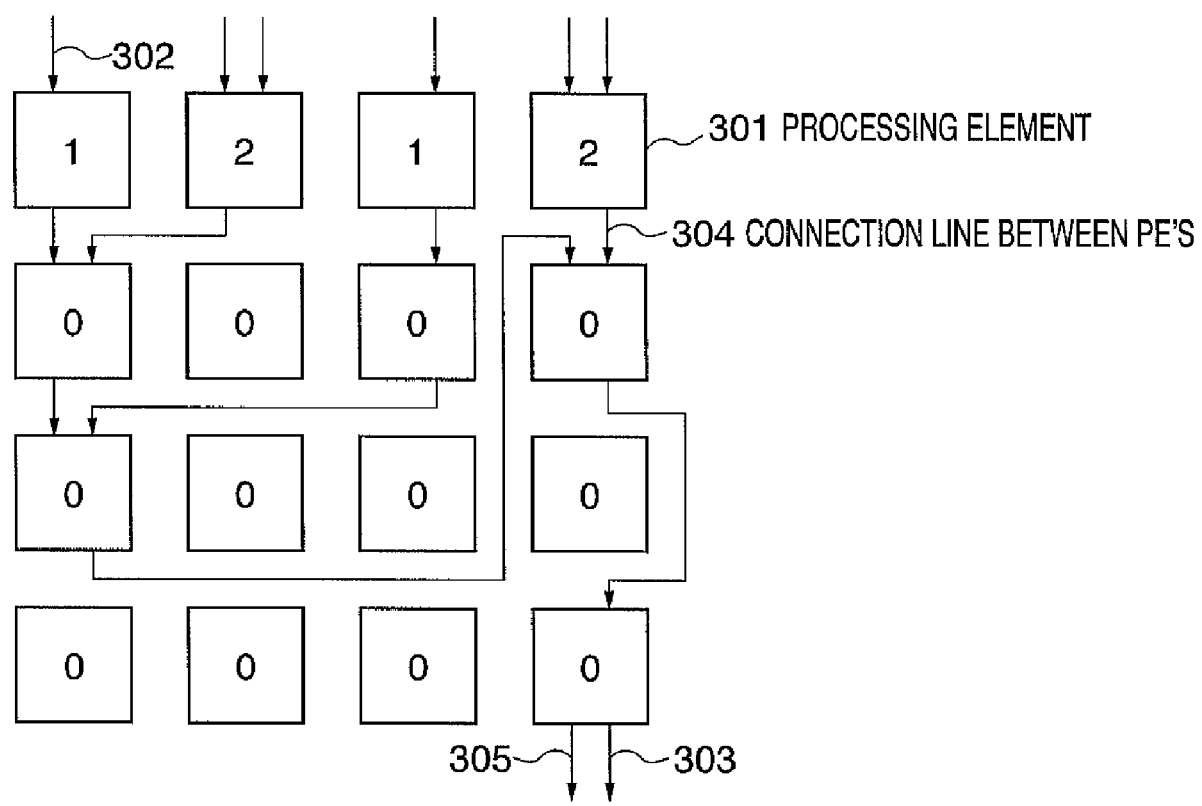
FIG. 4 is a diagram useful in explaining an example of calculation of the number of input data items in the PE matrix, which illustrates counts of input data items in respective processing elements in an initial input state.
Figure 5:
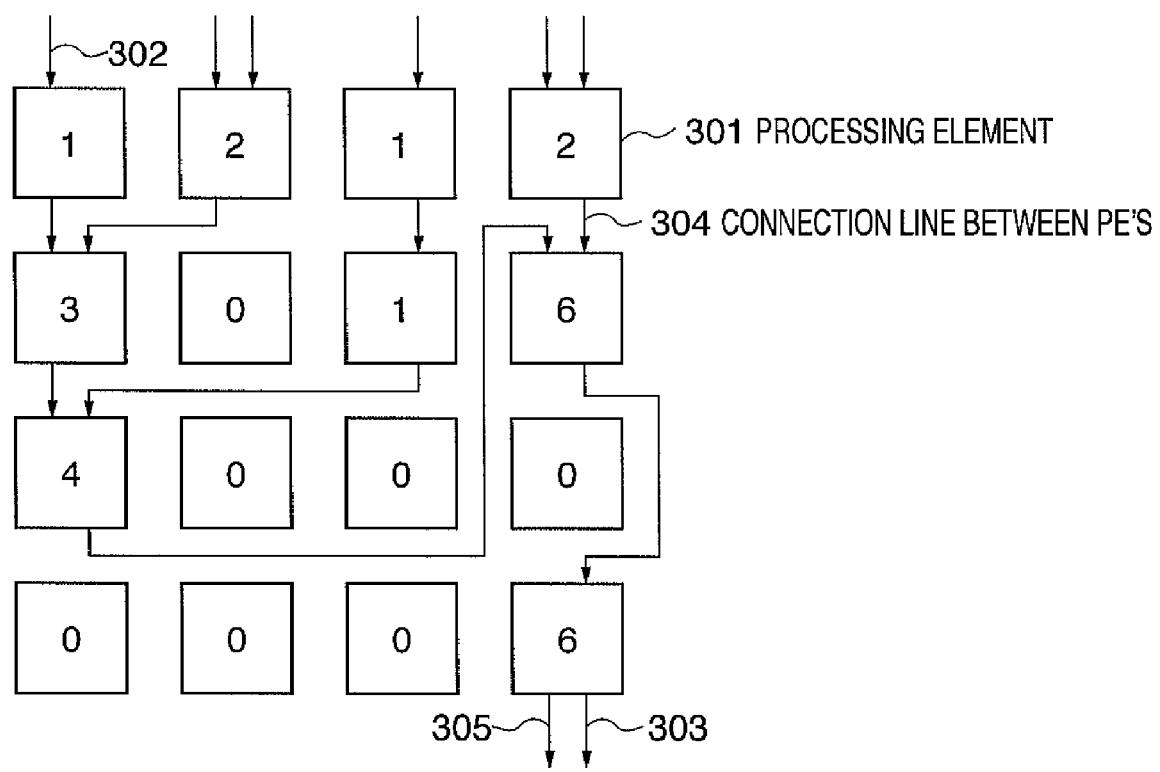
FIG. 5 is a diagram useful in explaining the example of calculation of the number of input data items in the PE matrix, which illustrates counts of input data items in the respective processing elements four clock cycles after the state shown in FIG. 4.

FIGS. 4 and 5 are useful in explaining different total counts of input data items being processed by processing elements between two different time points time elapsed as measured by clocks in the case where the processing element matrix configuration shown in FIG. 3 is employed. FIG. 4 shows the number of input data items being used by each processing element immediately after the input data 302 output from the load buffer 110 is initially input to the PE matrix 101.

A value written in the box representative of each processing element represents the number of data items being used thereby. The number of data items used by a processing element that receives input from two lines is equal to 2, while the number of data items used by a processing element that receives input from a single line is equal to 1.

FIG. 5 shows the number of data items being used in each processing element four clock cycles after the state shown in FIG. 4. A value written in the box representative of each processing element represents the number of data items being used thereby. The value is equal to a value obtained by adding the numbers of input data items in respective connected processing elements from which data is received. Further, the output data 303 and the input data count 305 are both output from the PE matrix 101 and delivered to the store buffer 111 and the input data count value buffer 113, respectively. Here, it is assumed that input data is input from the load buffer 110 every cycle.

It can be understood from FIG. 5 that the total number of input data items which are being processed by all the processing elements at a time point shown in the figure is equal to 26 (=1+2+1+2+3+1+6+4+6). The total number, i.e. the number of input data items currently being processed by all the processing elements can be calculated by adding input data counts received by each processing element from one or more processing elements connected thereto, using the adder 114 (see FIG. 8) of the processing element, and totalizing the sums of input data counts obtained for the respective processing elements.

Figure 6:
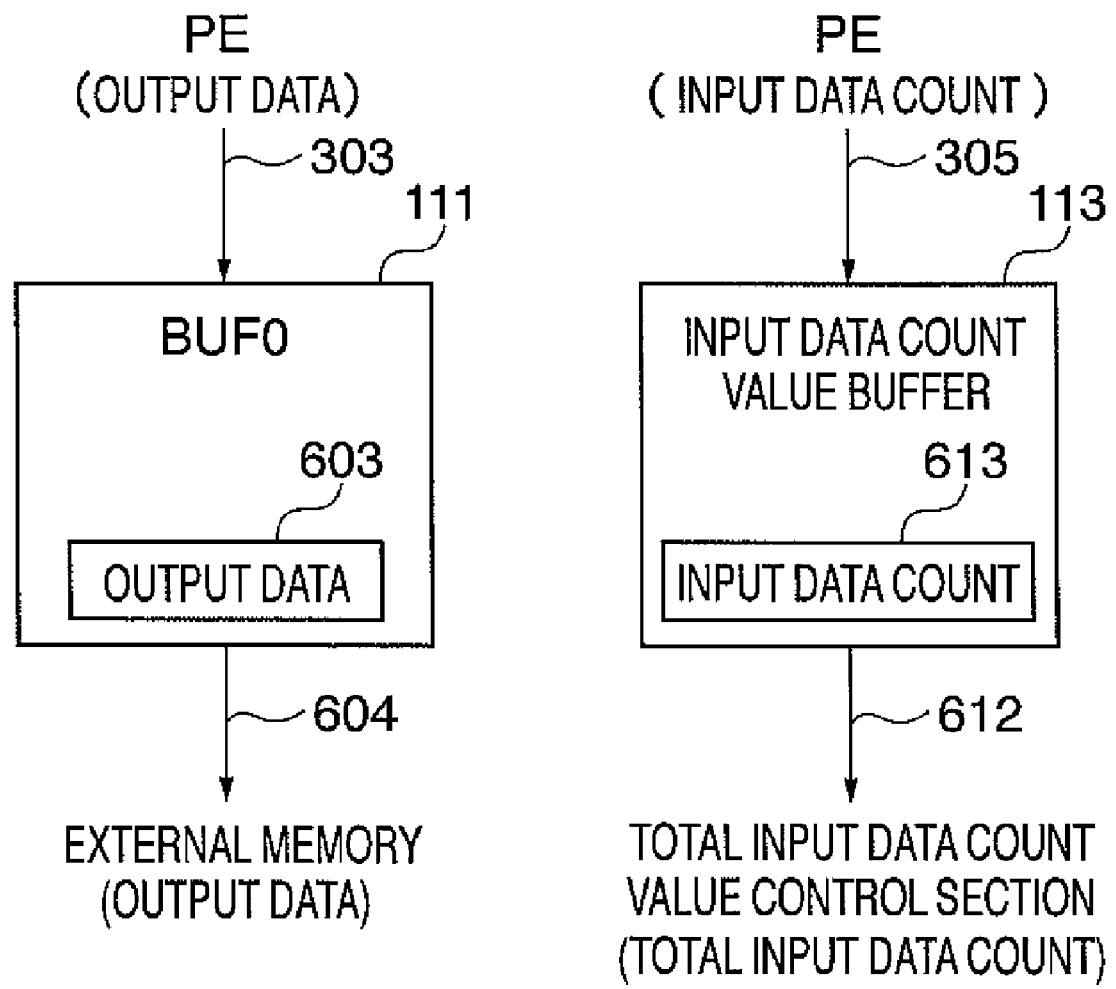
FIG. 6 is a schematic diagram of a storage buffer and an input data count value buffer.

FIG. 6 is a schematic diagram of the store buffer 111 and that of the input data count value buffer 113.

A method of calculating an input data count corresponding to the number of data items stored in the store buffer 111 will be described with reference to FIG. 6. The output data 303 is output from the PE matrix 101. The store buffer 111 buffers the output data 303 in an amount corresponding to several clock cycles, and the output data 303 corresponding to one clock cycle to output data 603, and delivers the output data 603 as the output data 604 to the external memory 145.

The input data count 305 is output from the PE matrix 101 as the signal indicative of the number of input data items used for obtaining the corresponding output data 303. Reference numeral 613 designates an input data count (the number of input data items) corresponding to the output data 603. A total input data count 612 is indicative of a value obtained by adding all input data counts stored in the input data count value buffer 113, and is output to the total input data count value control section 112. The total input data count 612 increases or decreases depending on the output data 603 delivered from the store buffer 111.

More specifically, whenever the output data 303 corresponding to one cycle which was output from the PE matrix 101 and has been buffered in the store buffer 111 is set to the output data 603, the associated input data count 305 is set to the input data count 613 in the input data count value buffer 113. Further, whenever the output data 603 is output from the store buffer 111, the associated input data count is deleted from the data count 613. Therefore, the value indicated by the total input data count signal 612 is equal to the total number of input data items used for obtaining all output data stored in the store buffer 111.

Depending on an algorithm, an input data count corresponding to output data from the PE matrix is constant. In such a case, the total input data count 612 may be obtained by calculating an integer multiple of the input data count 305.

Figure 7:
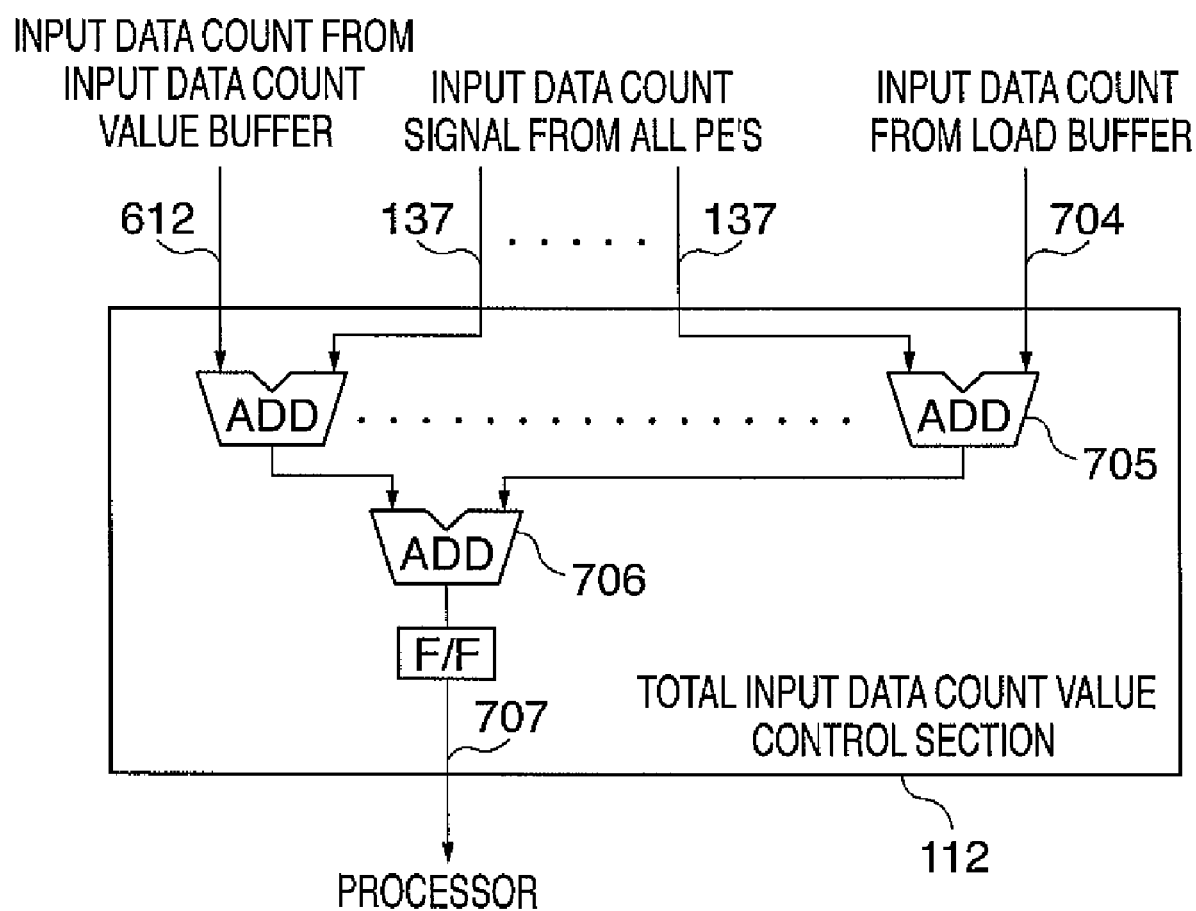
FIG. 7 is a block diagram of a total input data count value control section.

FIG. 7 is a block diagram of the total input data count value control section 112.

Referring to FIG. 7, the total input data count value control section 112 calculates a total of all the input data counts in the PE matrix 101, as mentioned with reference to FIG. 1. The total input data count 612 is output from the input data count value buffer 113. The signal 137 is indicative of the input data count output from each processing element (see FIG. 8). An input buffer-stored data count 704 is indicative of the number of input data items stored in the load buffer 110. The total input data count value control section 112 carries out addition of counts indicated by all input signals using a plurality of adders 705 and an adder 706. The value obtained by the addition is output as the signal 707 to the processor 107 and is used for calculation of the reload address.

Next, the operation of each section within the dynamically reconfigurable device fault-detectable processing unit according to the present embodiment will be described with reference to FIGS. 9 and 10.

Figure 9:
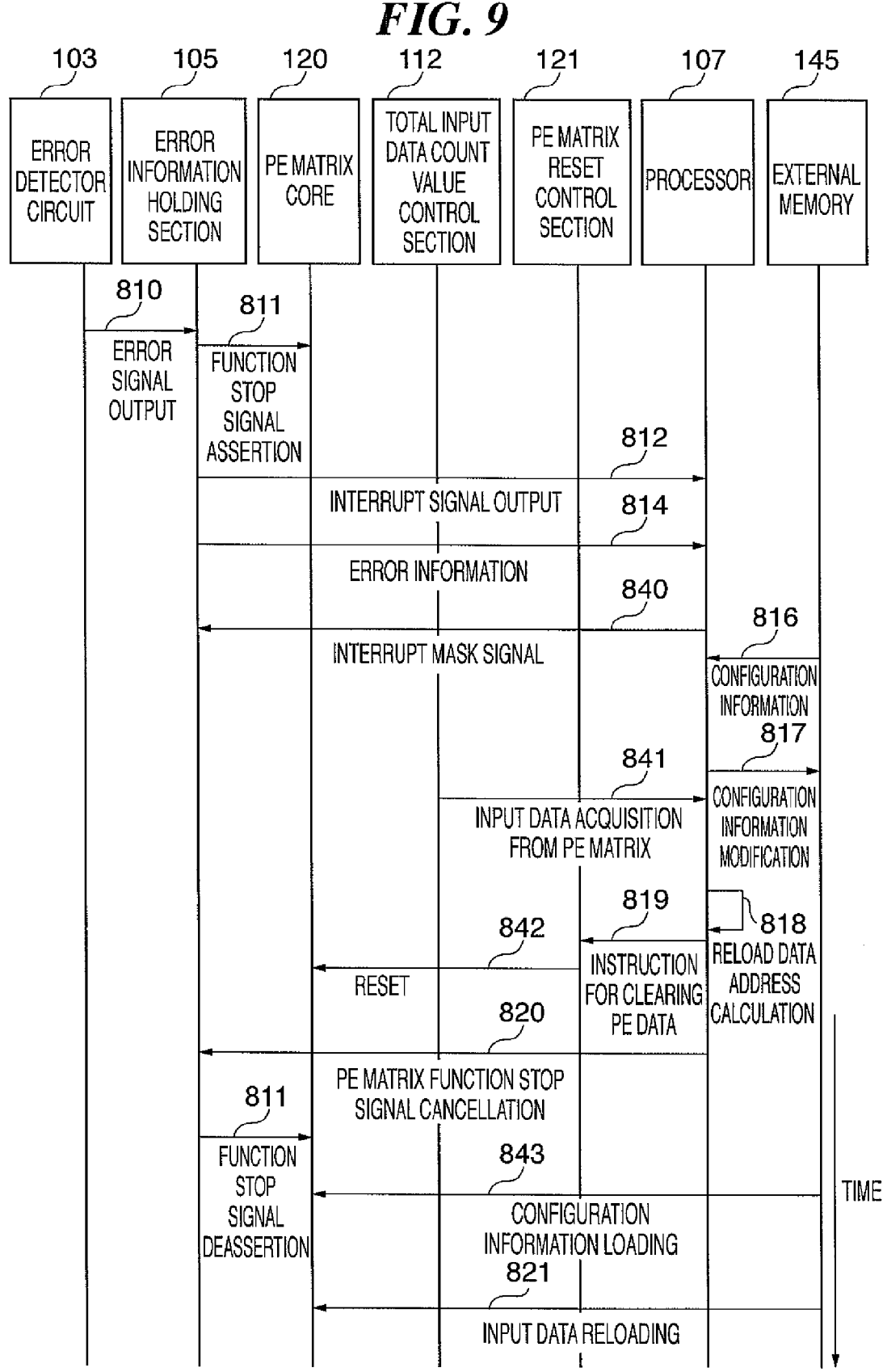
FIG. 9 is a diagram showing data processing timing between sections within the dynamically reconfigurable device fault-detectable processing unit and a flow of data processing.
Figure 10:
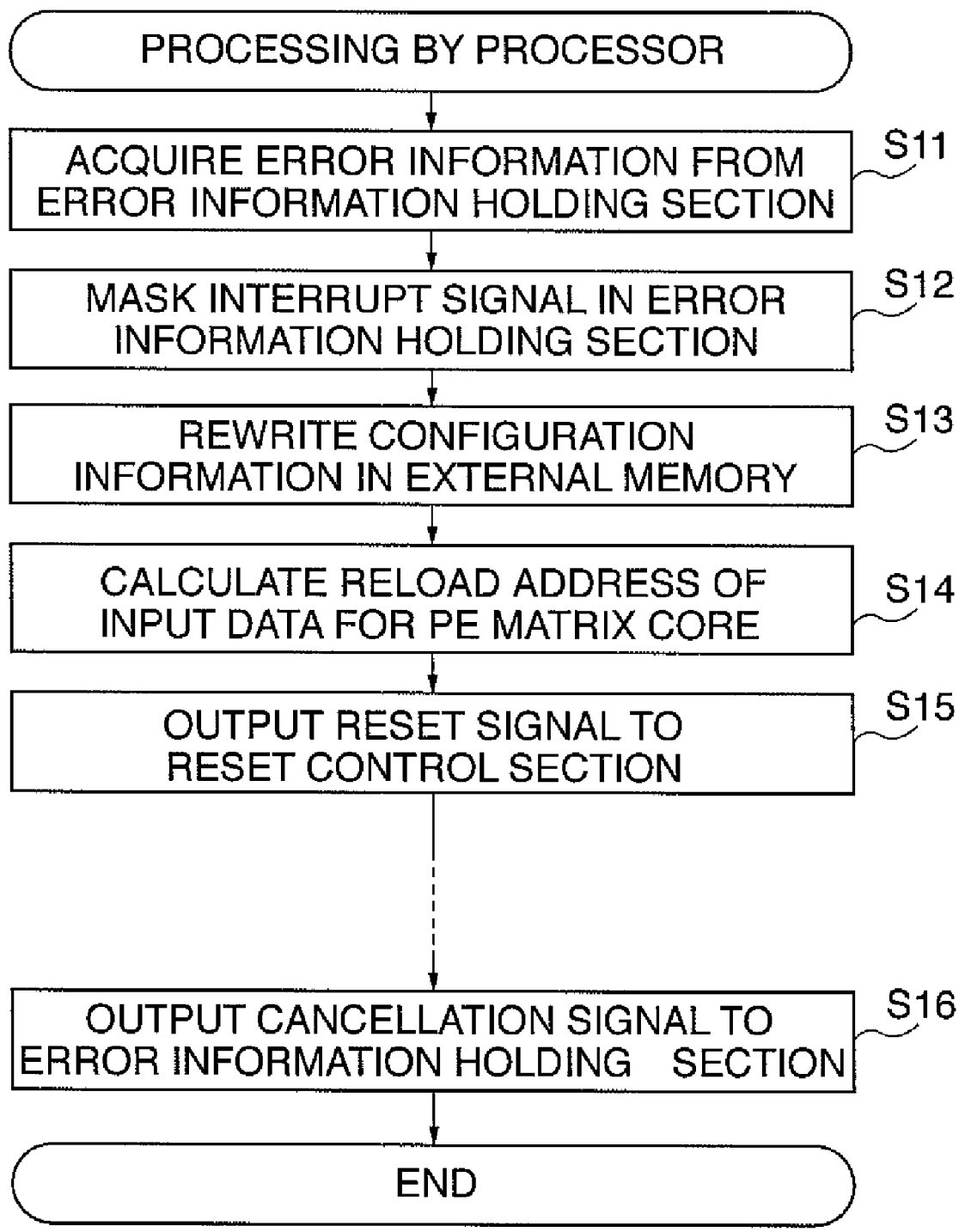
FIG. 10 is a flowchart showing a procedure of processing executed by a processor.

FIG. 9 is a diagram showing data processing timing between the sections within the dynamically reconfigurable device fault-detectable processing unit and a flow of data processing. FIG. 10 is a flowchart showing a procedure of processing executed by the processor 107.

Referring to FIG. 9, the lapse of time is indicated by a vertical arrow directed from the top toward the bottom. Each arrow between sections (the error detector circuit 103, the error information holding section 105, the PE matrix core 120, the total input data count value control section 112, the processor 107, and the external memory 145) represents a signal delivered from one section to another, and also indicates a direction in which the signal flows.

When the error detector circuit 103 of a processing element detects an error of the processing element, it outputs an error signal 810 (136) to the error information holding section 105 to thereby transmit error information. When receiving the error signal 810 (136), the error information holding section 105 holds the error information. Then, the error information holding section 105 outputs an interrupt signal 812 (140) to the processor 107 to notify the error information 814 (141) thereto. Further, the error information holding section 105 delivers a function stop signal 811 (139) to the PE matrix core 120 to thereby stop processing by the PE matrix core 120.

After receiving the interrupt signal 812 from the error information holding section 105, the processor 107 acquires the error information 814 (141) (step S11). After acquiring the error information 814 (141), the processor 107 outputs an interrupt mask signal 840 (160) to the error information holding section 105 to mask the interrupt signal 812 (140) (step S12). After masking the interrupt signal 812 (140), the processor 107 acquires configuration information 816 (104 in FIG. 1) from the external memory 145. Further, based on the error information 814 (141), the processor 107 rewrites the configuration information 104 in the external memory 145 into new configuration information 817 by delivering a rewrite signal 144 so as to inhibit the use of the faulty processing element (step S13). That is, reconfiguration is performed such that a processing element as a substitute for the faulty processing element carries the same processing that the faulty processing element was doing before becoming faulty. Further, the connection relationship between the processing elements is reconfigured. As a consequence, an input to the faulty processing element is routed to the processing element substituted for the faulty processing element, and an output from the substitute processing element is routed to an output destination to which the faulty processing element has been connected before becoming faulty.

Then, the processor 107 acquires an input data count 841 (707) indicative of the number of data items in the PE matrix core 120 from the total input data count value control section 112 and calculates the reload address from which input data should start to be input to the PE matrix by an address calculating process 818 (step S14). In the address calculating process 818, an address where data to be processed by the PE matrix 101 when restarting processing is stored is determined in accordance with the progress of processing by the PE matrix 101. After completion of the address calculating process 818, the processor 107 outputs a reset instructing signal (PE matrix data clearing instruction) 819 (142) to the PE matrix reset control section 121 (step S15).

After receiving the reset instructing signal 819 from the processor 107, the PE matrix reset control section 121 outputs a reset signal 842 (143) to the PE matrix core 120 to invalidate all data within the PE matrix core 120. The data items invalidated by the PE matrix reset control section 121 are counted by the total input data count value control section 112. After resetting the PE matrix 101, the processor 107 outputs a PE matrix function stoppage cancellation signal 820 (190) to the error information holding section 105 (step S16), followed by terminating the processing.

After receiving the PE matrix function stoppage cancellation signal 820 (190), the error information holding section 105 deasserts the function stop signal 811 (139) to enable the PE matrix 101 to perform processing. Thereafter, the PE matrix core 120 loads configuration information 843 therein from the external memory 145 to change the configuration information into new configuration information 843. Further, the PE matrix core 120 reloads input data 821 therein, starting from the reload address calculated by the address calculating process 818. Thus, even when a processing element fails during execution of processing, it is possible to normally restart the processing without replacing an LSI including the faulty processing element with a new one. Since the faulty processing element is no longer used, it has no effects on the PE matrix 101.

As described above, according to the present embodiment, when an error occurs in a processing element in the dynamically reconfigurable device during execution of an application, the error information holding section 105 inhibits the PE matrix core 120 from processing.

Further, the processor 107 provides control such that the PE matrix reset control section 121 invalidates all data in the PE matrix core 120 so as to prevent error data which is formed using data from the faulty processing element from being output to the external memory 145.

Then, the processor 107 modifies configuration information so as to inhibit the use of the faulty processing element, whereafter input data corresponding to the invalidated data is reloaded from the external memory 145, and the processing by the PE matrix core 120 is restarted.

Thus, when an error occurs in a processing element in the PE matrix 101 during execution of an application, it is possible to detect the error of the processing element immediately. Further, even after the error of the processing element having been detected, it is possible to continue processing by the PE matrix 101.

It is to be understood that the object of the present invention may also be accomplished by supplying a system or an apparatus with a storage medium in which a program code of software, which realizes the functions of the above described embodiment, is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, an optical disk, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

This application claims the benefit of Japanese Application No. 2006-006295 filed Jan. 13, 2006, which is hereby incorporated by reference herein in its entirety.

What is claimed is:

1. A reconfigurable processor comprising:
a processing element matrix having a plurality of data processing units; and
a reconfiguration unit that sets configuration information into said processing element matrix, such that a processing performed by one of the data processing units, and a connection between the one of the data processing units and another one of the data processing units are changed to:
substitute a faulty data processing unit with a non-faulty data processing unit among the data processing units;
carry out with the non-faulty data processing unit a processing that the faulty data processing unit was carrying out before becoming faulty;
route an input to the faulty data processing unit to the non-faulty data processing unit; and
route an output from the non-faulty data processing unit to an output to which the faulty data processing was connected before becoming faulty.

2. A reconfigurable processor as claimed in claim 1, wherein said reconfiguration unit reconfigures said processing element matrix such that the faulty data processing unit does not affect the output of said processing element matrix.

3. A reconfigurable processor as claimed in claim 1, each of said data processing units has a detection unit that detects an error thereof.

4. A reconfigurable processor as claimed in claim 1, wherein said processing element matrix restarts processing after being reconfigured.

5. A reconfigurable processor as claimed in claim 1, wherein said processing element matrix processes data read out from a storage device, and said reconfiguration unit determines a storage location of data to be processed by said processing element matrix after reconfiguration, in the storage device, according to progress of processing by said processing element matrix.

6. A method of reconfiguring a reconfigurable processor having a processing element matrix having a plurality of data processing units, the method comprising:
- a detection step of detecting an error in each of the data processing units; and
- a reconfiguration step of setting configuration information into the processing element matrix such that a processing performed by one of the data processing units, and a connection between the one of the data processing units and another one of the data processing units are changed to:
- substitute a faulty data processing unit with a non-faulty data processing unit among the data processing units;
- carry out with the non-faulty data processing a processing that the faulty data processing unit was carrying out before becoming faulty;
- route an input to the faulty data processing unit to the non-faulty data processing unit; and
- route an output from the non-faulty data processing unit to an output to which the faulty data processing was connected before becoming faulty.

7. A method as claimed in claim 6, wherein said reconfiguration step reconfigures the processing element matrix such that the faulty data processing unit does not affect the output of the processing element matrix.

8. A method as claimed in claim 6, further comprising the step of causing the processing element matrix to restart processing after being reconfigured.

9. A method as claimed in claim 6, further comprising the step of determining a storage location of data to be processed by the processing element matrix after reconfiguration, according to progress of processing by the processing element matrix.

10. A computer-readable storage medium storing a computer program, that when executed by a computer, causes the computer to execute a method for reconfiguring a reconfigurable processor including a processing element matrix having a plurality of data processing units, the computer-readable storage medium being a floppy disk, a hard disk, an optical disk, a magnetic tape, a nonvolatile memory card, or a ROM, or being an equivalent of a floppy disk, a hard disk, an optical disk, a magnetic tape, a nonvolatile memory card, or a ROM, the computer program comprising:
- a detection module for detecting an error in each of the processing devices; and
- a reconfiguration module for setting configuration information into the processing element matrix such that a processing performed by one of the data processing units, and a connection between the one of the data processing units and another one of the data processing units are changed to:
- substitute a faulty data processing unit with a non-faulty data processing unit among the data processing units;
- carry out with the non-faulty data processing unit a processing that the faulty data processing unit was carrying out before becoming faulty;
- route an input to the faulty data processing unit to the non-faulty data processing unit; and
- route an output from the non-faulty data processing unit to an output to which the faulty data processing was connected before becoming faulty.

11. A computer-readable storage medium as claimed in claim 10, wherein said reconfiguration module reconfigures the processing element matrix such that the faulty data processing unit does not affect the output of the processing element matrix.

12. A computer-readable storage medium as claimed in claim 10, further comprising a restart module for causing the processing element matrix to restart processing after being reconfigured.

13. A computer-readable storage medium as claimed in claim 10, further comprising a storage location determining module for determining a storage location of data to be processed by the processing element matrix after reconfiguration, according to progress of processing by the processing element matrix.

\* \* \* \* \*